United States Patent Office 3,098,062

Patented July 16, 1963

3,098,062

PRODUCTION OF POLYMERS OF PROPYLENE

John P. Hogan, Bartlesville, Okla., assignor to Phillips Petroleum Company, a corporation of Delaware No Drawing. Filed July 5, 1960, Ser. No. 40,572
18 Claims. (Cl. 260—93.7)

This invention relates to the production of solid olefin polymers. In one aspect, the invention relates to an improved method for preparing solid polymers of propylene having a high isotactic content.

Various processes for the polymerization of olefins are described in the literature. Generally, these polymerizations are carried out in the presence of a catalyst. One catalyst which has recently been disclosed for use in the polymerization of olefin has been described in U.S. Patent 2,825,721, issued to J. P. Hogan et al., which comprises, as the sole essential effective catalytic ingredients, chromium oxide and at least one material selected from the group consisting of silica, alumina, zirconia, and thoria, at least part of the chromium being in the hexavalent state at the initial contacting of hydrocarbon with said catalyst.

This invention relates to polymerization processes employing these new chromium-containing catalysts. More specifically, this invention relates to the polymerization of propylene with said catalyst in the presence of an aryl-substituted 1,3-butadiene.

It has been found that when certain olefins, such as propylene, are contacted with such a catalyst a polymer is obtained which contains greater or lesser quantities of a fraction which is crystalline and which is characterized by a certain regularity of molecular structure. Thus, a polypropylene molecule can be considered as a chain of two-carbon units with a methyl side group attached to every other carbon atom in the chain. Certain polymers of this type are characterized by the fact that they contain series of such monomer units in which all the methyl side groups are oriented in space at regular positions or at the same regularly recurring angle with respect to adjacent methyl groups along the carbon chain. These polymers are known as isotactic polymers. The portion of the polymer having this regular structure is highly crystalline and is generally referred to as isotactic polymer. The amount of isotactic polymer contained in the total polymer product formed in any given polymerization appears to have a significant influence on certain properties of the polymer product, such as hardness, modulus, ultimate tensile strength, range of melting temperatures, and molding and fiber forming properties. The higher the isotactic content of the polymer the more outstanding are the physical properties of that polymer.

It is an object of this invention, therefore, to provide an improved process for producing olefin polymers.

It is another object of this invention to provide an improved process for producing isotactic polymers of propylene.

Yet another object of the invention is to provide a process for improving the isotactic content of catalytically produced polymers of propylene.

Other and further objects and advantages of the invention will become apparent to those skilled in the art upon consideration of the accompanying disclosure.

Broadly speaking, these objects are accomplished by polymerizing propylene under polymerization conditions in the presence of a catalyst comprising chromium oxide and at least one material selected from the group consisting of silica, alumina, zirconia, and thoria, at least part of the chromium being in the hexavalent state, and at least one aryl-substituted 1,3-butadiene. When proceeding in accordance with the present invention, it has been found that polymers having isotactic contents approximately twice that of the conventional chromium oxide catalyzed polypropylene. The reason for the unexpected improvement obtained by employing the aryl-substituted butadiene in the process of this invention is not completely understood. Furthermore, the results obtained are even more surprising when it is noted that only very small amounts of the aryl-substituted 1,3-butadiene are added during the polymerization. In general, the addition of the aryl-substituted 1,3-butadiene to a polymerization system containing catalyst and olefin as herein described makes it possible to obtain a polymer product having higher isotactic content than that obtainable for the chromium oxide catalyst in the absence of such compound.

As herein employed and as understood by those skilled in the art, the term "isotactic polymer" represents a polymer which is insoluble in normal heptane which is at its boiling point at one atmosphere. The insoluble fraction is believed to represent crystalline material which is characterized by a certain regularity of molecular structure. The higher the isotactic content of the polymer the more outstanding are the physical properties of the polymer. Hence, the production of a polymer of propylene of higher isotactic content according to the method of this invention represents a substantial contribution to the art.

The isotactic content of the polymer as herein employed was quantitatively determined by placing $2.5 \pm 0.1$ grams of polymer in a Wade extraction thimble and extracting in an ASTM rubber extraction apparatus for 2.5 hours with about two liters of boiling normal heptane. The thimble was then removed and force dried in an air oven at 212° F. for 2 hours after which it was cooled in a desiccator and weighed. The weight percent of residue based on original polymer was calculated and recorded as isotactic content. The non-isotactic polymer was recovered by evaporation of the normal heptane.

The isotactic polymer can also be recovered by extracting the polymer with other suitable organic liquids such as the alkenes having from 4 to 10 carbon atoms per molecule. The extraction temperature depends on the particular liquid. For many of the preferred liquids this temperature is between about 170 to 230° F. The isotactic polymer which is not dissolved by the hydrocarbon liquid can be dried to recover its adsorbed liquor. The resulting product can be further fractionated if desired and the polymer which dissolves in the hydrocarbon liquid can also be recovered in further processing.

The olefins which are polymerized in accordance with the present process are propylene and mixtures of a major amount of propylene and a minor amount of a copolymerizable olefin selected from the group consisting of 1-olefins having from 4 to 8 carbon atoms per molecule and no branching nearer the double bond than the 4-position, preferably 1-butene.

The polymerization process of this invention is conducted in the presence of a catalyst containing as an essential catalytic ingredient chromium oxide associated with at least one porous oxide selected from the group consisting of silica, alumina, zirconia, and thoria. Liquid phase or vapor phase operation can be employed. A highly satisfactory method involves contacting the monomer in the presence of a hydrocarbon diluent in a liquid phase with a suspended comminuted activated catalyst of the type described by Hogan et al., supra. The polymer is then precipitated from the diluent by cooling and separated by filtration, hydrocarbon flashing, steam distillation, or the like.

The polymerization modifiers which I employ are aryl-substituted 1,3-butadienes having the formula

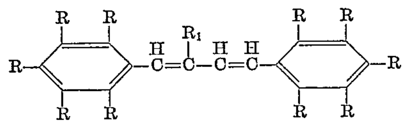

wherein $R_1$ is selected from the group consisting of hydrogen and a methyl radical; the R substituents on the phenyl radicals are selected from the group consisting of hydrogen, alkyl, cycloalkyl, and aryl, said alkyl groups have 1 to 10 carbon atoms, said cycloalkyl and aryl groups have 5 to 8 carbon atoms, and the maximum number of carbon atoms in the R groups on any one phenyl substituent is 10. Example of these phenyl-substituted 1,3-butadienes are illustrated by the following compounds: 1,4-diphenyl-1,3-butadiene; 1,4-di(4-methylphenyl)-1,3-butadiene; 1,4-di(2,3,4,5-tetramethylphenyl)-1,3-butadiene; 1-(4-methylphenyl)-4-(4-ethylphenyl)-1,3-butadiene; 1,4-di(3-ethylphenyl)-1,3-butadiene; 1,4-di(2-ethylphenyl)-1,3-butadiene; 1,4-di(2-isopropylphenyl)-1,3-butadiene; 1,4-di(4-pentylphenyl)-1,3-butadiene; 1,4-di(3-octylphenyl)-1,3-butadiene; 1,4-di(2,4-dipentylphenyl)-1,3-butadiene; 1,4-di(3-decylphenyl)-1,3-butadiene; 1,4-di(4-cyclopentylphenyl)-1,3-butadiene; 1,4-di(3-cyclohexylphenyl)-1,3-butadiene; 1,4-di(4-cyclooctylphenyl)-1,3-butadiene; 1-(4-cyclohexylphenyl)-4-(4-cyclooctyl)-1,3-butadiene; 1-(4-methylphenyl)-4-(4-cyclohexylphenyl)-1,3-butadiene; 1,4-di(2-biphenyl)-1,3-butadiene; 1,4-di(4-biphenyl)-1,3-butadiene; 1,4-diphenyl-2-methyl-1,3-butadiene; 1,4-di(4-methylphenyl)-2-methyl-1,3-butadiene; 1,3-di(2-cyclohexylphenyl)-2-methyl-1,3-butadiene; 1,4-di(3-n-decylphenyl)-2-methyl-1,3-butadiene; 1-phenyl-4-(4-methylphenyl)-1,3-butadiene and the like.

In the practice of this invention, one or more of the above-described compounds is employed. The ratios of the catalyst components employed in the present process can be varied rather widely depending upon the particular monomer used and the operating conditions. Preferably the chromium content of said catalyst is in the range of 0.1 to 10 weight percent and the hexavalent chromium content of said catalyst is at least 0.1 weight percent.

The chromium oxide catalyst is prepared by any suitable method, such as those methods described in Hogan et al., supra, preferably by impregnation of particulate silica, alumina, zirconia, silica-alumina, or thoria or the like with a solution of chromium oxide or a compound convertible to chromium oxide by calcination, followed by drying and activation of the composite at a temperature in the range of 450 to 1500° F., preferably 750 to 1500° F., for a period of 3 to 10 hours or more. Activation is conducted by heating in a stream of inert gas such as carbon dioxide, nitrogen and oxygen-containing gases.

It has been discovered that only very small amounts of the aryl-substituted 1,3-butadiene compound are required in order to obtain the improvement of this invention. The amount of aryl-substituted 1,3-butadiene employed is preferably in the range of about 1 to 30 parts by weight of the aryl-substituted 1,3-butadiene for each 100 parts by weight of the chromium oxide catalyst present in the polymerization zone, preferably 5 to 25 parts by weight.

The aryl-substituted 1,3-butadiene can be charged to the polymerization zone prior to or during the polymerization process. Further the aryl-substituted 1,3-butadiene can be added separately as a solution in an inert diluent, such as the paraffinic diluents preferred for the polymerization process, or in any other convenient manner. The polymerization process employing these aryl-substituted 1,3-butadienes can be carried out as a batch or as a continuous process by processes such as described in Hogan et al., supra. For example, a batch process can be effected by dispersing the chromium-containing catalyst and one or more of the described aryl-substituted butadienes in a diluent which is relatively inert and liquid under the conditions of the process and does not have a deleterious effect on the catalyst. Suitable diluents include paraffinic, cycloparaffinic and/or aromatic hydrocarbons preferably containing from 3 to 12 carbon atoms per molecule. Examples of such diluents include propane, butane, pentane, hexane, cyclohexane, methylcyclohexane, benzene, toluene, xylene, and the like. The relative amounts of diluent and olefin employed in the polymerization depend upon the particular conditions and techniques used and are generally governed by the capacity of the apparatus to effect suitable agitation and heat removal. In general, the total olefin content of the feed mixture charged to the polymerization reactor is in the range of 0.5 to 25 weight percent of the diluent present in the reactor.

The polymerization can be carried out at a temperature varying over a rather broad range, for example, from 0 to 500° F.; however, it is usually preferred to conduct the reaction at a temperature in the range 100 to 300° F., more preferably from 180 to 230° F. The pressure employed in the process can vary from atmospheric and below to 1,000 p.s.i. or higher. Often, a pressure of at least 100 p.s.i. to 700 p.s.i. or higher is preferred. However, gas phase reactions at lower pressures are possible. High pressures, such as 700 p.s.i. to 10,000 p.s.i. favor production of high molecular weight polymers in which isotactic content, as determined by solvent extraction, is difficultly measured.

It has been found that various materials in some instances may have a tendency to inactivate the catalyst composition of this invention. These materials include carbon dioxide, oxygen and water. Therefore, it is usually desirable to free the monomer to be polymerized from these materials as well as from other materials which may tend to inactivate the catalyst. Any of the known means for removing such contaminant can be employed. Furthermore, the hydrocarbon diluent and catalyst should also be freed of such contaminants and the reaction vessel should be purged of air and moisture before carrying out the reaction. In some cases, small amounts of contaminants can be tolerated. It is to be understood, however, that the amount of such materials present in the reaction mixture shall not be sufficient to completely inactivate the catalyst.

In a specific embodiment of this invention, propylene is polymerized in a batch process in a reactor containing the chromium oxide catalyst and the porous oxide support, cyclohexane, and the aryl-substituted 1,3-butadiene. It is preferred to add a portion of the diluent into the reactor initially after which this material is purged with an inert gas such as nitrogen. The catalyst components and the aryl-substituted 1,3-butadiene are then charged separately to the reactor with intermediate purging. Preferably, the catalyst components are premixed with a portion of the diluent. Any diluent remaining can then be introduced into the reactor after which the monomer is added to the reactor. Thereafter, the reactor is heated until polymerization is initiated and the reactor is maintained at the desired conditions of temperature and pressure. If the aryl-substituted 1,3-butadiene compound is sufficiently high boiling so that it will not be removed during purging operations, it can be added to the reactor with the initial diluents. It can also be charged after addition of the catalyst components or at any other suitable time, preferably prior to the addition of the monomer. If desired, the aryl-substituted 1,3-butadiene compound can be added immediately prior to the addition of the monomer and in some instances it may be added with the initial monomer charge. While it is preferred to operate in accordance with the aforementioned charging procedure, it is to be understood that it is not intended to limit the invention to any particular method for adding the reactant materials to the reactor. Furthermore, the process can be carried out continuously by maintaining the above-described concentration of reactants, catalysts and diluent in the reactor for a suitable residence time. The residence time used in a continuous process can vary widely since it depends to a great extent upon the temperature in which the process is carried out and upon a specific monomer that is to be polymerized. However, the residence time in a continuous process generally falls within the range of one second to 10 hours or more. In a batch process, the time for the reaction can also vary widely such as 15 minutes up to 24 hours or more.

Upon the completion of the polymerization reaction, any excess olefin is vented and the contents of the reactor are then treated by any suitable method to inactivate the catalyst and separate the polymer product. In one method, inactivation of the catalyst is accomplished by washing with an alcohol, water or other suitable materials. In some cases, the catalyst inactivating treatment also removes a major proportion of the catalyst residues while in other cases it may be necessary to treat the polymer with an acid, a base or other suitable material to effect the desired removal of the catalyst residues. The treatment of the polymer can be carried out in a comminution zone, such as a Waring Blendor, so that a finely divided polymer is thereby provided. The catalyst can be separated from the polymer by dissolving the polymer in a suitable solvent and removing the catalyst by filtration or other convenient means. In many cases this catalyst inactivation step may be deleted. The polymer, such as by reducing the temperature of the solution, and then decanting, centrifuging, filtering, or using other suitable methods of liquid-solid separation, after which the polymer is dried. The diluent and treating agents can be separated by any suitable means such as by fractional distillation and reused in the process.

Having described the invention by a specific embodiment, a more complete understanding of the invention can be obtained by referring to the following illustrative examples which are not intended, however, to be unduly limitative of the invention.

EXAMPLE I

*Preparation of Catalyst*

A catalyst comprising chromium oxide on a silica-alumina support was prepared from a commercial silica-alumina support having a $SiO_2$ to $Al_2O_3$ weight ratio of 88 to 12 with the total support amounting to 85.3 weight percent of the base when dried at 1000° F. The silica-alumina was impregnated with an aqueous solution of $CrO_3$ so as to give 9.62 grams of $CrO_3$ (5.0 grams of chromium) per 90.38 grams of silica-alumina based on the dry weight at 1000° F. The chromium trioxide solution contained about 16.2 grams of water per gram of chromium trioxide so as to provide sufficient water to thoroughly impregnate the catalyst base. The impregnated base was dried at 250 to 300° F. and fluidized in air for 5 hours at 1000° F. after bringing the temperature up to 1000° F. over 1 to 2 hours. The catalyst thus prepared was then used for the polymerization of propylene as described below.

*Polymerization of Propylene*

Polymerization grade cyclohexane which had been washed with sulfuric acid, dried with alumina and stored under nitrogen was employed as solvent. A 1-liter reactor which was flushed with nitrogen was charged with 300 ml. of the cyclohexane, 0.52 gram of 1,4-diphenyl-1,3-butadiene, and 4.96 grams of the above-described catalyst. The reactor stirrer was turned on and the reactor was heated to about 214° F. in 10 minutes. Propylene was then admitted to the reactor so as to maintain a pressure between 450 to 500 p.s.i.g. while maintaining a reaction temperature of about 222° F. After a 2.5-hour reaction period the heater was turned off and the reaction was terminated by venting the reactor to atmospheric pressure. The solid product recovered from the reactor was first dried in a beaker on a hot plate while flowing natural gas over the polymer. The polymer was then dried to constant weight in a vacuum oven (pressure less than 10 mm. Hg) at a temperature of 210° F. The semi-solid product thus recovered weighed 53.0 grams and was found to contain 14.0 weight percent isotactic polymer.

EXAMPLE II

Another run was made under the conditions described in Example I using approximately twice the amount of 1,4-diphenyl-1,3-butadiene used in Example I. In this example, 1.12 grams of 1,4-diphenyl-1,3-butadiene and 4.91 grams of the chromium-containing catalyst were employed for the polymerization of propylene with a reaction period of two hours at temperatures between 221 and 225° F. and a pressure in the reactor of 460 to 500 p.s.i.g. The yield of 40.9 grams of product was found to contain 15.5 weight percent isotactic polymer.

When propylene was polymerized according to the methods described in the above two examples but in the absence of the aryl-substituted 1,3-butadiene, the isotactic content of the product was found to be 7.9 weight percent.

EXAMPLE III

Three additional runs are made using three different aryl-substituted 1,3-butadienes. The procedure of Example I is carefully followed with propylene being polymerized in the presence of 300 milliliters of cyclohexane, 4.91 grams of the chromium oxide catalyst of Example I, and the following aryl-substituted 1,3-butadiene with the reactor being maintained at 220–225° F. and 500 p.s.i.g for two hours. The reaction is terminated and the polymer recovered as hereinbefore described. The following is a tabulation of some of the conditions and results of these runs:

| Aryl-Substituted 1, 3-Butadiene Compound | Amount, gms. | Wt. Percent Based on Catalyst | Yield, gms. | Weight Percent Isotactic Polypropylene |
|---|---|---|---|---|
| 1-phenyl-4-(4-methylphenyl)-1, 3-butadiene | 0.29 | 6 | 59.0 | 13.3 |
| 1, 4-diphenyl-2-methyl-1, 3-butadiene | 0.37 | 7.5 | 56.3 | 13.9 |
| 1, 4-di(3-ethylphenyl)-1, 3-butadiene | 0.25 | 5 | 62.4 | 13.1 |

Thus, by the practice of this invention wherein the polymerization of propylene is effected in the presence of the aryl-substituted 1,3-butadiene, there results a nearly two-fold increase in the isotactic content of the polymer.

The polymers produced in accordance with this invention have utility in applications where solid plastics are used. They can be molded to form articles of any desired shape such as bottles or other containers for liquids. Furthermore, they can be formed into sheets, film or pipe by extrusion or other suitable methods.

While certain examples, structures, composition and process steps have been described for purposes of illustration, the invention is not limited to these. Variation and modification within the scope of the disclosure and the claims can readily be effected by those skilled in the art.

What I claim is:

1. In a process for the polymerization of 1-olefins selected from the group consisting of propylene and mixtures of propylene and copolymerizable 1-olefins in the presence of a catalyst comprising chromium oxide and at least one material selected from the group consisting of silica, alumina, zirconia, and thoria, at least part of the chromium being in the hexavalent state, the improvement which comprises contacting said propylene with said catalyst in the presence of a compound selected from the group consisting of aryl-substituted 1,3-butadienes having the following formula:

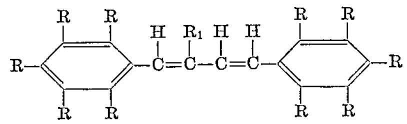

wherein $R_1$ is selected from the group consisting of hydrogen and a methyl radical, R is selected from the group consisting of hydrogen, alkyl groups, cycloalkyl groups and aryl groups, said alkyl groups have 1 to 10 carbon atoms per molecule, said cycloalkyl and aryl groups have 5 to 8 carbon atoms per molecule, and the maximum number of carbon atoms in the R group on any one phenyl substituent is 10 under conditions wherein the isotactic content of the polymer is increased.

2. The process of claim 1 wherein said compound is 1,4-diphenyl-1,3-butadiene.

3. The process of claim 1 wherein said compound is 1-phenyl-4-(4-methylphenyl)-1,3-butadiene.

4. The process of claim 1 wherein said compound is 1,4-diphenyl-2-methyl-1,3-butadiene.

5. The process of claim 1 wherein said compound is 1,4-di(3-ethylphenyl)-1,3-butadiene.

6. In a process for the polymerization of propylene in the presence of a hydrocarbon diluent and a catalyst comprising chromium oxide and at least one material selected from the group consisting of silica, alumina, zirconia, and thoria, at least part of the chromium being in the hexavalent state, the improvement which comprises contacting said propylene with said diluent and catalyst in the presence of 1 to 30 weight percent based on catalyst weight of a compound selected from the group consisting of aryl-substituted 1,3-butadienes having the following formula:

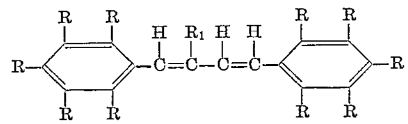

wherein $R_1$ is selected from the group consisting of hydrogen and a methyl radical, R is selected from the group consisting of hydrogen, alkyl groups, cycloalkyl groups and aryl groups, said alkyl groups have 1 to 10 carbon atoms per molecule, said cycloalkyl and aryl groups have 5 to 8 carbon atoms per molecule, and the maximum number of carbon atoms in the R group on any one phenyl substituent is 10 under conditions wherein the isotactic content of the polymer is increased.

7. The process of claim 6 wherein said compound is 1,4-diphenyl-1,3-butadiene.

8. The process of claim 6 wherein said compound is 1-phenyl-4-(4-methylphenyl)-1,3-butadiene.

9. The process of claim 6 wherein said compound is 1,4-diphenyl-2-methyl-1,3-butadiene.

10. The process of claim 6 wherein said compound is 1,4-di(3-ethylphenyl)-1,3-butadiene.

11. A process for the polymerization of propylene which comprises introducing propylene into a polymerization zone in the presence of a hydrocarbon diluent and a catalyst comprising chromium oxide and at least one material selected from the group consisting of silica, alumina, zirconia, and thoria, at least part of the chromium being in a hexavalent state, and a compound selected from the group consisting of aryl-substituted 1,3-butadienes having the following formula:

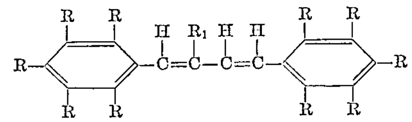

wherein $R_1$ is selected from the group consisting of hydrogen and a methyl radical, R is selected from the group consisting of hydrogen, alkyl groups, cycloalkyl groups and aryl groups, said alkyl groups have 1 to 10 carbon atoms per molecule, said cycloalkyl and aryl groups have 5 to 8 carbon atoms per molecule, and the maximum number of carbon atoms in the R group on any one phenyl substituent is 10; said polymerization zone is maintained under conditions wherein the isotactic content of the polymer is increased at a temperature in the range of 100 to 300° F. at a pressure sufficient to maintain substantially all the diluent in a liquid phase to produce a polymer and recovering said polymer.

12. The process of claim 11 wherein said compound is 1,4-diphenyl-1,3-butadiene.

13. The process of claim 11 wherein said compound is 1-phenyl-4-(4-methylphenyl)-1,3-butadiene.

14. The process of claim 11 wherein said compound is 1,4-diphenyl-2-methyl-1,3-butadiene.

15. The process of claim 11 wherein said compound is 1,4-di(3-ethylphenyl)-1,3-butadiene.

16. The process of claim 11 wherein said polymer is recovered by separating polymer from monomer, diluent and catalyst and contacting said polymer with a paraffinic solvent to extract a fraction concentrated in isotactic polypropylene and recovering said isotactic polypropylene.

17. The process of claim 16 wherein said solvent is normal heptane.

18. A process for the polymerization of propylene which comprises introducing said propylene into a polymerization zone in the presence of cyclohexane from 1 to 30 weight percent, 1,4-diphenyl-1,3-butadiene, based on catalyst weight, and a catalyst consisting of chromium oxide and silica-alumina, at least a part of the chromium being in a hexavalent state, maintaining said polymerization zone under conditions wherein the isotactic content of the polymer is increased at a temperature in the range of 100 to 300° F. and a pressure of 100 to 700 p.s.i.g. to produce a polymer, recovering said polymer, contacting said polymer with normal heptane at a temperature between about 170 and about 230° F. to extract a fraction concentrated in isotactic polypropylene and recovering said isotactic polypropylene.

References Cited in the file of this patent

UNITED STATES PATENTS 2,731,453 Field et al. ............. Jan. 17, 1956
2,825,721 Hogan et al. ............. Mar. 4, 1958